US007576317B1

(12) United States Patent
Tortonese et al.

(10) Patent No.: US 7,576,317 B1
(45) Date of Patent: Aug. 18, 2009

(54) CALIBRATION STANDARD FOR A DUAL BEAM (FIB/SEM) MACHINE

(75) Inventors: Marco Tortonese, Mountain View, CA (US); Mehran Nasser-Ghodsi, Hamilton, MA (US)

(73) Assignee: KLA-Tencor Technologies Corporation, Milpitas, CA (US)

( * ) Notice: Subject to any disclaimer, the term of this patent is extended or adjusted under 35 U.S.C. 154(b) by 0 days.

(21) Appl. No.: 12/116,890

(22) Filed: May 7, 2008

Related U.S. Application Data

(62) Division of application No. 11/119,056, filed on Apr. 28, 2005, now Pat. No. 7,372,016.

(51) Int. Cl.
*G01N 21/84* (2006.01)

(52) U.S. Cl. ................................ 250/252.1; 356/243.1

(58) Field of Classification Search ............. 250/252.1; 356/243.1, 430

See application file for complete search history.

(56) References Cited

U.S. PATENT DOCUMENTS

| | | | | |
|---|---|---|---|---|
| 5,534,359 | A | 7/1996 | Bartha et al. | 428/688 |
| 5,665,905 | A | 9/1997 | Bartha et al. | 73/105 |
| 5,684,301 | A | 11/1997 | Cresswell et al. | 250/306 |
| 5,914,784 | A | 6/1999 | Ausschnitt et al. | 356/624 |
| 5,920,067 | A | 7/1999 | Cresswell et al. | 250/306 |
| 5,955,654 | A | 9/1999 | Stover et al. | 73/1.89 |
| 5,960,255 | A | 9/1999 | Bartha | |
| 5,969,273 | A | 10/1999 | Archie et al. | 73/865.8 |
| 6,016,684 | A | 1/2000 | Scheer et al. | 73/1.89 |
| 6,128,089 | A | 10/2000 | Ausschnitt et al. | 356/401 |
| 6,384,408 | B1 | 5/2002 | Yee et al. | 250/252.1 |
| 6,646,737 | B2 | 11/2003 | Tortonese et al. | 356/243.4 |
| 6,750,447 | B2 | 6/2004 | Houge et al. | 250/252.1 |
| 6,770,868 | B1 | 8/2004 | Bevis et al. | 250/252.1 |
| 7,049,157 | B2 | 5/2006 | Lu et al. | 438/18 |

(Continued)

OTHER PUBLICATIONS

MAG*I*CAL ® A Magnification Calibration Sample for Transmission Electron Microscopes, from Electron Microscopy Sciences webpage: Calibration Standards Specimens and Aids URL: http://www.emsdiasum.com/microscopy/products/calibration/magical.aspx, 2003.

Non-Final Office Action dated Oct. 05, 2007 for U.S. Appl. No. 11/119,056 (now US Patent 7,372,016), 7 pages.

(Continued)

*Primary Examiner*—Kiet T Nguyen
(74) *Attorney, Agent, or Firm*—Joshua D. Isenberg; JDI Patent

(57) ABSTRACT

Calibration of measurements of features made with a system having a micromachining tool and an analytical tool is disclosed. The measurements can be calibrated with a standard having a calibrated feature with one or more known dimensions. The standard may have one or more layers including a single crystal layer. The calibrated feature may include one or more vertical features characterized by one or more known dimensions and formed through the single crystal layer. A trench is formed in a sample with the micromachining tool to reveal a sample feature. The analytical tool measures one or more dimensions of the sample feature corresponding to one or more known dimensions of the calibrated feature. The known dimensions of the calibrated feature are measured with the same analytical tool. The measured dimensions of the sample feature and the calibrated feature can then be compared to the known dimensions of the calibrated feature.

22 Claims, 5 Drawing Sheets

U.S. PATENT DOCUMENTS

| | | | | |
|---|---|---|---|---|
| 7,301,638 | B1 * | 11/2007 | Tortonese et al. | 356/430 |
| 7,361,941 | B1 * | 4/2008 | Lorusso et al. | 257/100 |
| 7,372,016 | B1 | 5/2008 | Tortonese et al. | 250/252.1 |
| 2003/0058437 | A1 | 3/2003 | Tortonese et al. | 356/243.4 |

OTHER PUBLICATIONS

Notice of Allowance and Fee(s) Due dated Jan. 10, 2008 for U.S. Appl. No. 11/119,056, 4 pages.
US 5,841,144, 11/1998, Cresswell (withdrawn)

* cited by examiner

CALIBRATION STANDARD FOR A DUAL BEAM (FIB/SEM) MACHINE

CROSS-REFERENCE TO RELATED APPLICATION

This application is a divisional of prior U.S. patent application Ser. No. 11/119,056 filed Apr. 28, 2005, the entire disclosures of which are incorporated herein by reference.

FIELD OF THE INVENTION

This invention generally relates to calibration and more specifically to calibration of sample measurements made using systems having both a micromachining tool and an analytical tool.

BACKGROUND OF THE INVENTION

In the integrated circuit industry, electron microscopes are central to microstructural analysis of integrated circuit components. The quality of a finished integrated circuit is highly dependent on the measurement and control of the circuit's critical dimensions. Thus, it is very important to ensure that critical dimension measurements received from metrology tools, such as electron microscopes, are precise and accurate. Typically, in critical dimension analysis of an integrated circuit component an electron microscope measures the apparent width of a structure when determining its dimensions. The apparent width of the structure is compared to critical dimension specifications in order to determine the compliance of the integrated circuit component.

Unfortunately, there are disadvantages to using the typical apparatus and method, as the apparent width of a structure as reported by the measurement tool is often different from the actual width of the structure. In addition, the discrepancy between the actual width and the apparent width of the structure could fluctuate from day to day, as well as from tool to tool. Thus, the integrity of the data derived from such measurements is often called into question, and is difficult to rely on.

In an effort to overcome this problem, it is possible to use a calibration piece having a structure with a known size. The calibration piece is loaded into the measurement tool and measured at regular intervals, such as once each day. The difference between the apparent width and the actual width of the structure on the calibration piece is used as a correction factor for other measurements. Unfortunately, even this procedure tends to not have the desired accuracy in all situations.

For example, most scanning electron microscopes can provide very good information about the dimensions of integrated circuit features within the plane of a wafer but very little information about the three-dimensional structure of these features. To over come this, dual beam tools having both a focused ion beam (FIB) and a scanning electron microscope (SEM) can be used. Such a tool uses the FIB to mill away a trench in the wafer proximate a feature of interest. The trench exposes a cross-section of the feature. Such a cross-section can be used to measure the physical dimensions of features in the direction perpendicular to the plane of the wafer. The SEM can be used to observe the cross-section and measure the size of the features in the horizontal and vertical directions. The electron beam from the SEM forms an angle that is approximately 45 degrees with respect to the plane of the wafer. Therefore, the image obtained from the SEM must be scaled by the cosine of the angle of incidence to obtain the actual size of the features. If the angle of incidence is not accurately known, the size of the features is in turn not known with accuracy.

FIGS. 1A-1B illustrate the problem. FIG. 1A shows a cross-section of a sample wafer 102. The sample wafer cross-section is viewed as shown in FIG. 1B. The FIB forms a trench 104 in the wafer 102. The trench 104 runs perpendicular to the plane of the drawings. The trench 104 exposes a sidewall 106 showing layers that make up features on the wafer 102. The features depicted in FIG. 1A appear on the sidewall 106. The view shown in FIG. 1A is taken assuming a particular angle of view θ. The angle of view θ is defined as the angle the SEM electron beam (indicated by the arrow) makes with respect to the plane of the wafer 102. A given feature has a thickness d' when measured by the SEM. The measured feature thickness however is the height of the projection of the feature onto the viewing plane, which is perpendicular to the direction of the beam. The actual feature thickness d can be determined from the known viewing angle θ as follows:

$$d=d'/\cos\theta$$

Note also the slant in the FIG. 1A, which begs the question as to whether it is real, or an artifact from the machine. A known standard may help answer the question. Unfortunately, there are no available standards and calibration techniques for calibrating such measurements.

Thus, there is a need in the art, for a method for calibrating vertical dimensions in dual beam FIB/SEM systems against a standard and a corresponding standard.

BRIEF DESCRIPTION OF THE DRAWINGS

Objects and advantages of the invention will become apparent upon reading the following detailed description and upon reference to the accompanying drawings in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Embodiments of the present invention include methods for in-situ calibration of measurements made with a dual beam system having a micromachining tool capable of exposing a sample cross-section and a metrology or inspection tool for analyzing the exposed sample cross-section. An example of such a dual beam system is one having a focused ion beam (FIB) and scanning electron microscope (SEM). Alternatively, embodiments of the invention can be applied to systems using alternative techniques to produce and/or analyze the sample cross-sections. Such alternative system may include laser ablation or electron beam ablation. Examples of suitable dual beam systems that can be used with embodiments of the present invention include the CLM-3D, manufactured by FEI, Hillsboro, Oreg., USA.

Figure 1A:
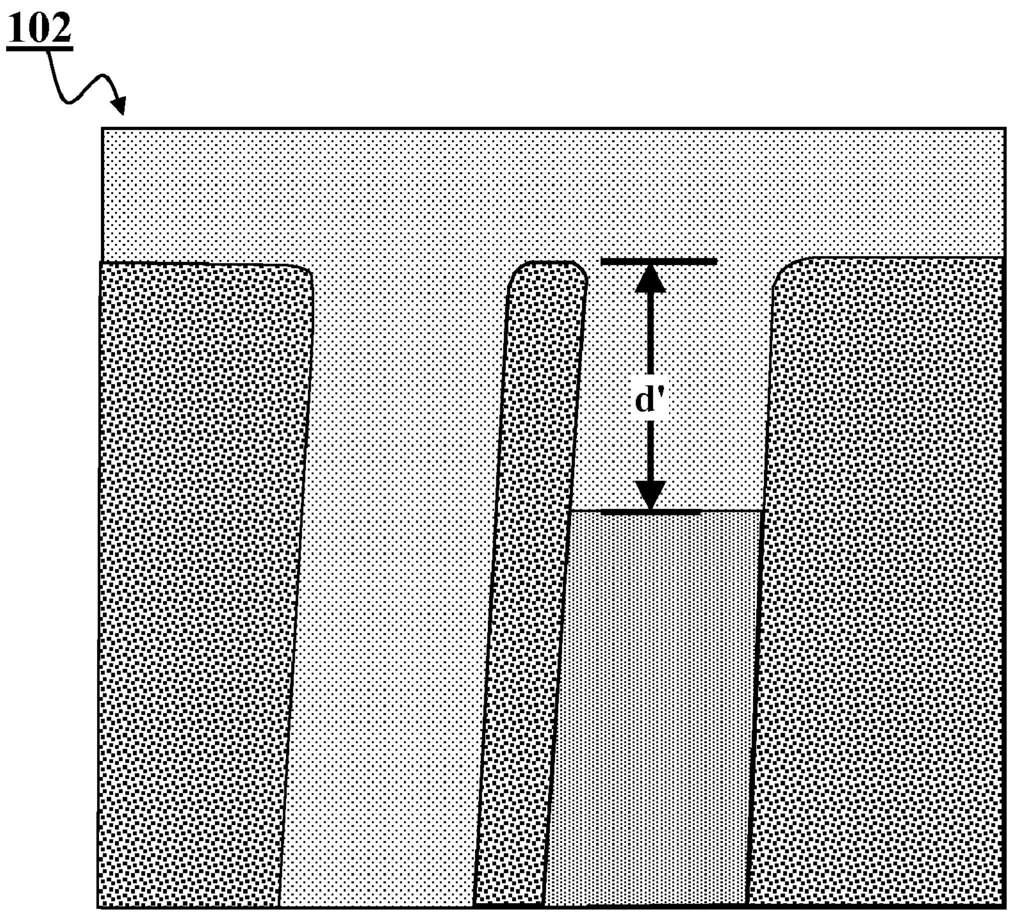
FIG. 1A illustrates a cross-sectional view of a portion of a semiconductor wafer as it would appear in a scanning electron micrograph taken with a FIB SEM dual beam system.
Figure 1B:
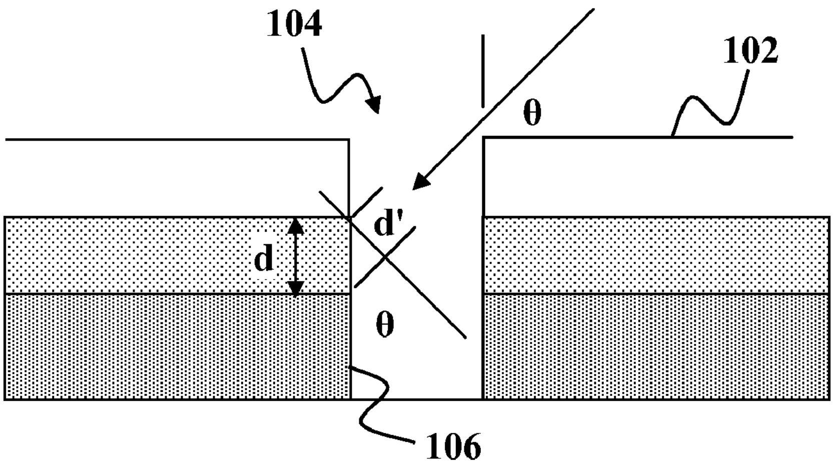
FIG. 1B is a schematic cross sectional view illustrating the geometry of the measurement depicted in FIG. 1A.
Figure 2A:
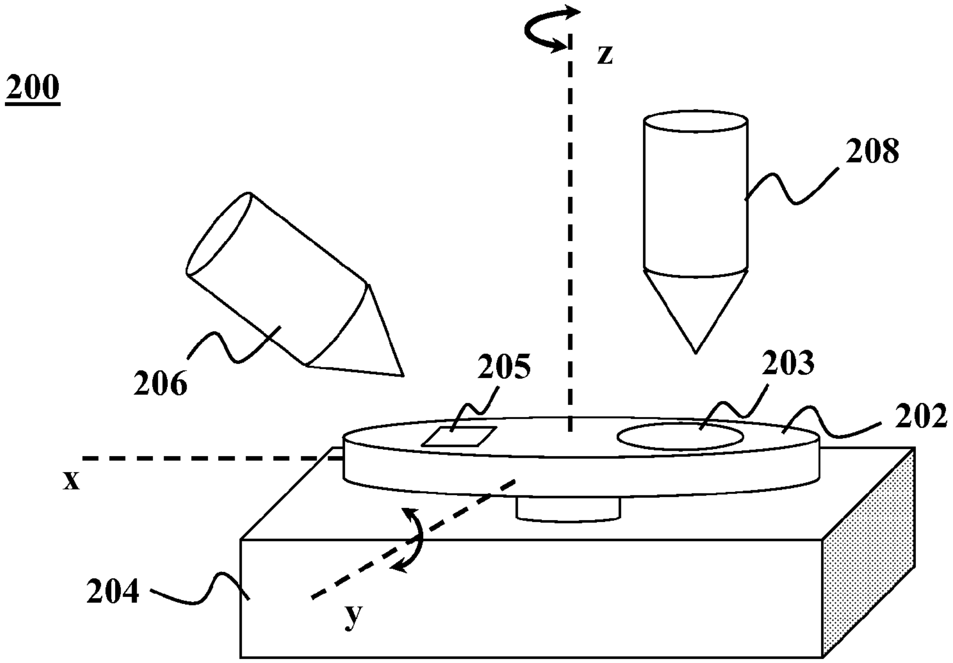
FIG. 2A is a schematic diagram of a FIB/SEM dual beam system that may be used with embodiments of the present invention.
Figure 2B:
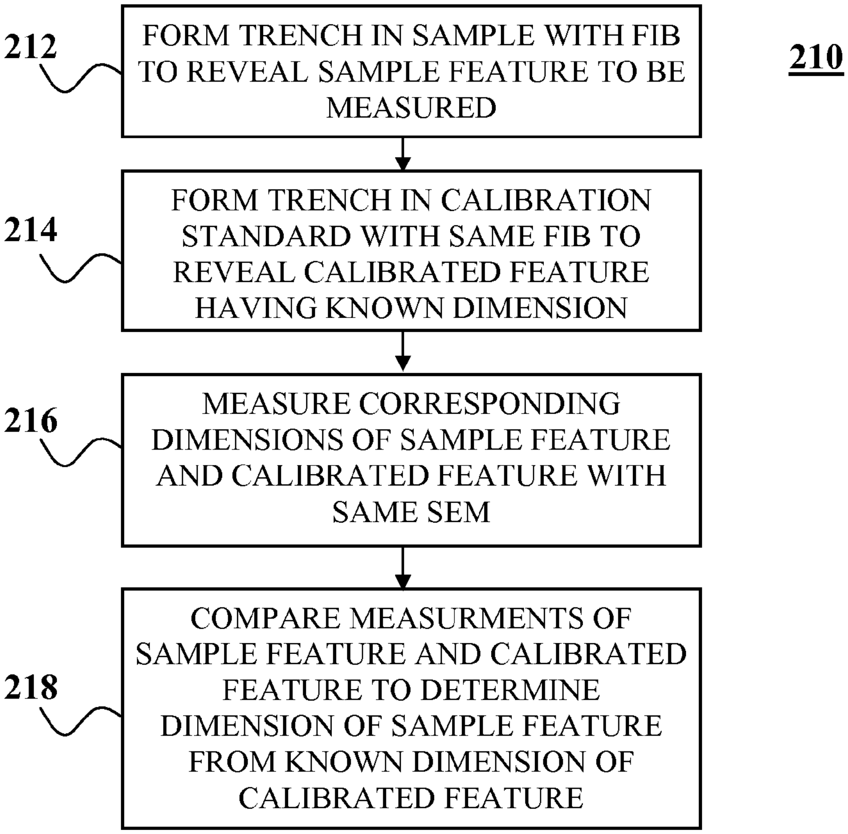
FIG. 2B is a flow diagram illustrating a method for calibrating a FIB/SEM dual beam system according to an embodiment of the present invention.

Embodiments of the invention can be understood by reference to FIGS. 2A-2B. FIG. 2A depicts a dual beam system 200 of a type that may be used with embodiments of the present invention. The system 200 includes a stage 202 mounted to a support 204. The support 204 may include mechanisms that allow the stage 202 to translate along x, y and z axes and to rotate about the y and z axes. A sample 203 and a calibration standard 205 may be mounted to the stage by suitable means, including vacuum or electrostatic chucks, adhesives and the like. The system 200 further includes a micromachining tool, for example a focused ion beam (FIB) source 208 and an analytical tool, such as a scanning electron microscope (SEM) 206. The FIB source 208 focuses a beam of energetic ions on the sample or standard mounted to stage 202 to mill away material in a controlled and localized fashion. The scanning electron microscope focuses an electron beam on a target mounted to the stage (e.g., the sample 203 or standard 205) and forms an image from electrons reflected from the target.

In alternative embodiments, FIB source 208 may be replaced with another suitable micromachining tool, e.g., a laser ablation tool or electron beam ablation tool. Similarly, the SEM 206 may be replaced with any other suitable analytical tool. As used herein, analytical tools include both inspection tools and metrology tools. Inspection tools are those which can detect defects within the sample 203. Metrology tools are used to measure the size and/or other physical properties of features of the sample 203. Examples of tools that may be used for inspection and/or metrology include, but are not limited to, critical-dimension scanning electron microscopes, scatterometers, optical microscope, scanning probe microscopes such as atomic force microscopes, scanning tunneling microscopes, lateral force microscopes, scanning capacitance microscopes, and near field optical microscopes, patterned wafer inspection systems, unpatterned wafer inspection systems, reticle inspection systems, fly height testers, and disk substrate inspection systems.

The flow diagram of FIG. 2B illustrates an embodiment of the method 210. The method 210 makes use of a calibration standard 205 having a calibrated feature with one or more known dimensions. At 212 a trench is formed in the sample 203 with the FIB source 208 to reveal a sample feature. At 214 a trench is also formed in a calibration standard with the same FIB to reveal the calibrated feature. At 216 the SEM 206 measures one or more dimensions of the sample feature that correspond to one or more of the known dimensions of the calibrated feature. The same SEM 206 is also used to measure one or more of the known dimensions of the calibrated feature. At 218 the measurements of the sample and standard features are compared to determine the dimensions of the sample feature from the known dimensions of the standard feature. The order of steps 212, 214 and 216 is not critical and subject to only a few limitations imposed by the practical necessity of exposing a feature with the FIB before measuring it with the SEM and the practical necessity of performing the sample and standard measurements before they can be compared in step 218. To simplify the comparison it is desirable to measure both the sample and the standard at the same viewing angle. Alternatively, the measurements of the sample and standard taken at different viewing angles can be compared if the two viewing angles are known or if there is a known difference between the two viewing angles.

According to alternative embodiments of the invention standards such as those described above may be checked in-situ for uniformity of the standard across a width of the standard. For example, a few trenches may be formed in the sample to reveal the calibrated feature at different locations across the width of the standard. The revealed calibrated feature may then be examined, e.g., with a SEM or CD-SEM. This allows a uniformity check of the standard across the width of the standard.

In certain embodiments of the invention the known dimensions of the standard feature may include one or more traceably measured dimensions. As used herein, a measurement is said to be "traceable" or "traceably measured" if the measurement has been made with a measurement system calibrated with a standard reference material traceable to a national testing authority. Such standard reference materials may provide the bases for the traceability to the International System of Units. Artifacts whose properties are traceable to fundamental quantities (e.g. speed of light, angle, wavelength of cesium etc.) are also regarded as "traceable". Artifacts whose properties are traceable to a lattice spacing of a known crystalline material of known crystalline orientation (e.g. the lattice spacing of silicon <110> etc.) are also regarded as "traceable". Examples of national testing authorities include, but are not limited to national laboratories such as the National Institute of Standards and Technology (NIST—Gaithersburg, Md., US), the Institute for National Measurement Standards (Montreal, Canada), the National Institute of Metrology (Beijing China, China), the Bureau National de Metrplogie (Paris, France), the Federal Institute for Materials Research and Testing (BAM—Berlin, Germany), The National Physics Laboratory (New Delhi, India), the Istituto di Metrologia "G. Colonnetti" (IMGC—Torino, Italy), the National Metrology Institute of Japan (Ibaraki, Japan), the National Physical Laboratory Center for Basic Metrology (Teddington, UK), the Bureau International des Poids et Mesures (BIPM—Sevres Cedex, France) and the International Organization of Legal Metrology (OIML—Paris, France). In addition, national testing authorities also include other laboratories delegated by the national laboratories.

Figure 3A:
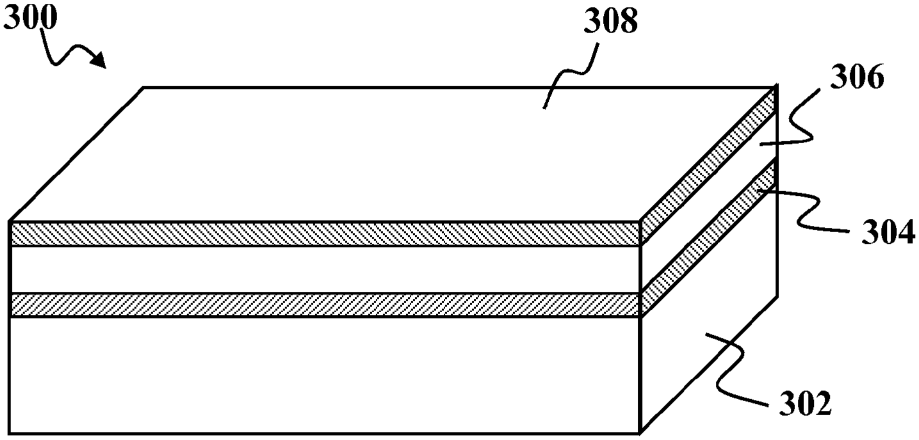
FIGS. 3A-3B are a sequence of three-dimensional diagrams illustrating calibration of FIB/SEM measurements according to an embodiment of the present invention.
Figure 3B:
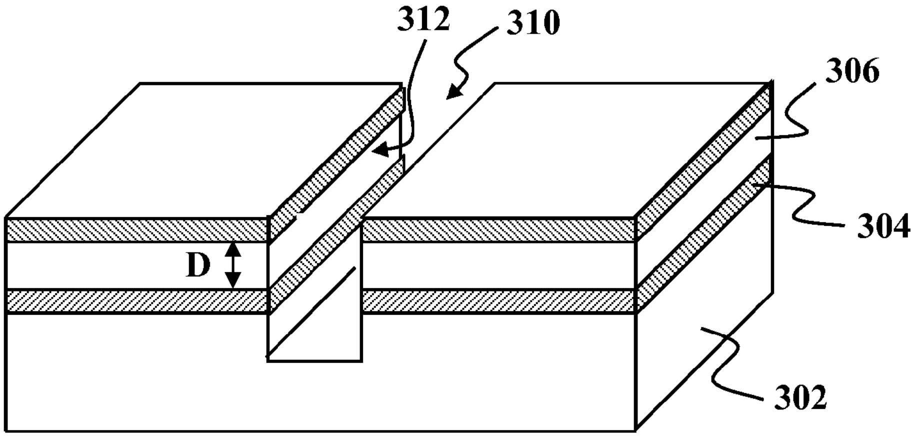
Figure 3C:
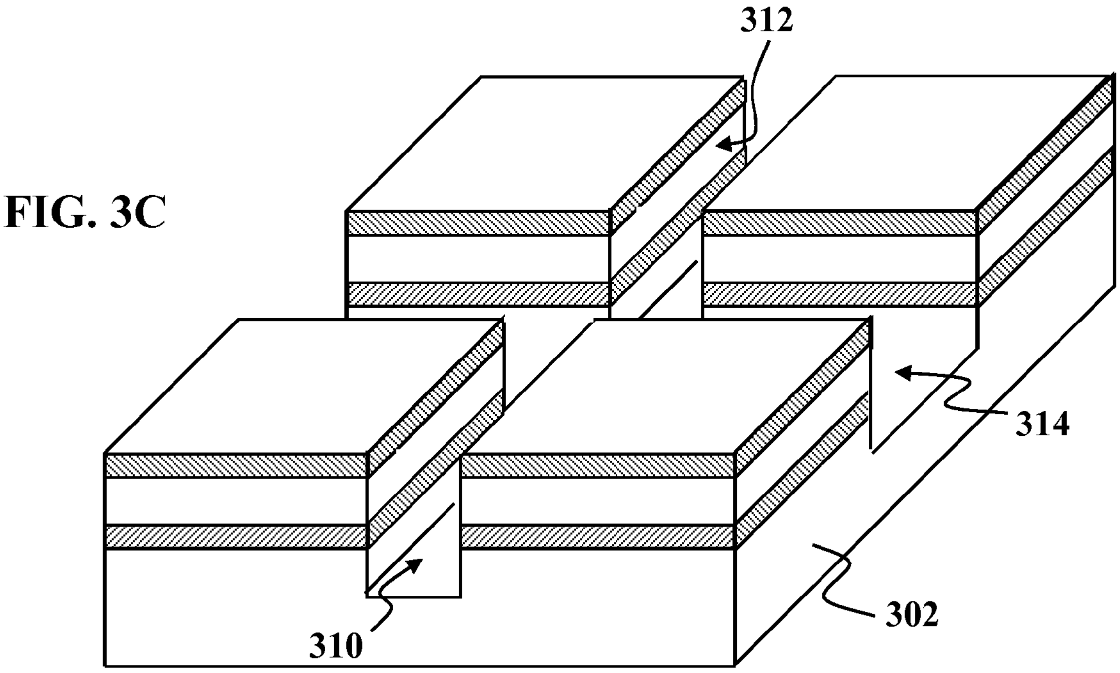
FIG. 3C is a three-dimensional diagram illustrating the use of intersecting trenches to verify sidewall angles according to an alternative embodiment of the present invention.

There are many different types of structures that may be used as the calibration standard 205. For example, FIGS. 3A-3C illustrate an example of the use of a calibration standard in embodiments of the present invention. As shown in FIG. 3A, the standard 300 generally includes one or more calibrated features. By way of example, the standard may include a substrate 302 made of a single crystal material. A first layer of oxide 304 is formed on a surface of the substrate 302 and a layer of single crystal material 306 is formed on the first oxide layer 304. A second oxide layer 308, e.g., a thermal oxide layer may be formed on the single crystal layer 306. The single crystal and oxide layers 304, 306, 308 are oriented more or less parallel to the surface of a sample to be analyzed with a FIB/SEM system. The FIB forms a trench 310 through the layers 304, 306, 308 as shown in FIG. 3B. The vertical structure of the layers can then be viewed on a sidewall 312 of the trench 310.

The two oxide layers provide a contrast in SEM images taken of the sidewall 312. The layer of single crystal material 306 can serve as a calibrated feature of the standard 300. A thickness D of the single crystal layer provides a known dimension. Thickness metrology techniques having high accuracy and traceability to NIST may be used to measure thickness D. Such thickness metrology techniques may include, for example, optical ellipsometry, optical spectrophotometry, optical interferometry, profilometry, energy dispersive X-ray spectroscopy ("EDS"), thermal and acoustic wave techniques, cross-sectional TEM, and X-ray techniques. The thickness D can be traceably measured. By way of example, the substrate 302 and oxide layer 304 and single crystal layer 306 may be formed from a silicon on insulator (SOI) wafer. The single crystal layer 306 can also be <110> silicon 0.5 μm thick and the top oxide layer 308 may be a 0.05 μm thick thermal oxide grown on top of the single crystal layer 306.

An additional problem that may arise with some FIB/SEM systems is that the sidewall 312 formed by ion beam milling with the FIB may not necessarily be vertical, i.e., perpendicular to the wafer surface. In such a case, the sidewall angle introduces an error in the measurement since a vertical feature will appear to be thicker or thinner due to the angling of the sidewall. If the standard 300 is sufficiently similar to the sample being analyzed it is reasonable to assume that, even if the sidewall angles are not vertical, the trenches in the standard and sample have essentially the same sidewall angles. If this is so the dimensions of the sample feature can be determined from direct comparison with measurements of the standard feature since the effects of the two sidewall angles would cancel each other out. However, if the two sidewall angles are different, a proper comparison of the sample and standard measurements would require knowledge of the sidewall angles.

To provide some information about the sidewall angle, a second trench can be formed in the sample and/or the standard that intersects the trench used to reveal the sample feature or standard feature. An example of this is depicted in FIG. 3C. Here a second trench 314 has been formed at right angles to the trench 310. The second trench 314 allows for viewing of the cross section of the first trench 310. By viewing SEM images of the cross-section of the first trench 310 one can determine the angle of the sidewall 312 with respect to the plane of the surface of the standard 300. In an exactly similar manner an intersecting trench can be formed in the sample to provide information about the sidewall angle of the trench used to reveal the sample feature.

Figure 4:
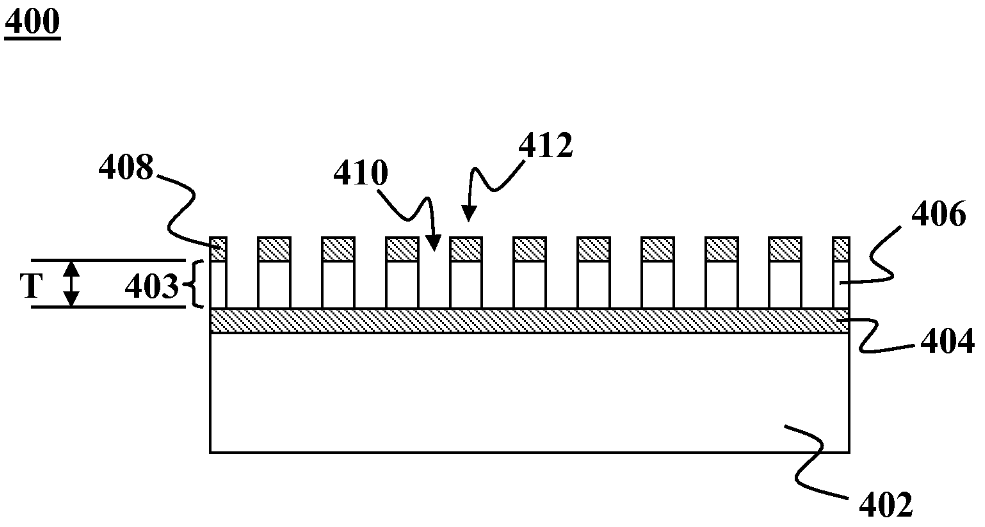
FIG. 4 is a cross-sectional diagram illustrating a calibration standard according to an embodiment of the present invention.

Additional embodiments of the present invention allow for calibration of measurements made parallel to the plane of a wafer. For example, as depicted in FIG. 4, a standard 400 may include a pitch structure as well as a vertical reference feature. The standard 400 generally includes a substrate 402, a vertical feature 403. The substrate 402 may be a crystalline material, e.g., single crystal silicon. In this example, the vertical feature 403 includes a layer of single crystal material 406 on a first oxide layer 404 and a second oxide layer 408 on the layer of single crystal material 406. The oxide layers 404, 408 provide contrast with the single crystal layer 406 in SEM images. In this example the vertical feature further includes a series of parallel trenches 410 that cut through the oxide layer, 408, and single crystal layer 406. The trenches 410, which run perpendicular to the plane of the drawing in FIG. 4, define a pitch structure with features 412 separated by the trenches 410. The pitch, i.e., number of features per unit distance, can be calibrated and certified using standard techniques.

By way of example, the standard 400 may be fabricated as follows. A structure having a SOI wafer providing the substrate 402 and first oxide layer 404, silicon <110> as the single crystal layer 406 and thermal oxide as the second oxide layer 408 may be used as a starting material. A grating with a suitable pitch, e.g., 2 μm pitch, can be formed by etching the trenches 410 through the oxide layers 404, 408 and through the silicon of the single crystal layer 406 with an anisotropic silicon etchant. e.g. tetramethylammonium hydroxide (TMAH). A dry etch technique can be used instead of a wet etch technique, for example, to obtain vertical features where <110> silicon may not be commercially available.

An advantage of <110> silicon is that it tends to produce vertical features that are highly perpendicular to the wafer surface when etched with standard techniques. Thus the crystalline orientation of sidewalls of features 412 containing a layer of <110> silicon can be used as a standard to certify perpendicularity. Alternatively, the crystallography of the single crystal layer 406 may alternatively have a <100> orientation to obtain cross-sectional features at a 54 degree angle instead of vertical.

The pitch can be certified with a calibrated optical microscope. Alternatively, a calibrated CD-SEM may be used instead of an optical microscope to measure the pitch of the grating. Alternatively light diffraction may be used to measure the pitch of the grating. The height of the features 412 can be certified with a stylus profilometer on appropriately larger features. As an alternative to profilometry, transmission electron microscopy (TEM) could be used to traceably determine the height of the features 412. In addition, the height of the features 412 can be traceably certified using thin film metrology techniques, such as ellipsometry.

There are many other variations on the standard 400 described above. For example, the size of the pitch and the thickness of the single crystal layer 406 can be altered to match the size of the features to be measured. Realistic sizes range from state-of-the-art lithographic patterning techniques, which today can be as small as 100 nm pitch, up to tens of microns in the lateral dimension, and from a few nanometers to hundreds of microns in the vertical direction. In addition, the shape of the trenches 410 and features 412 may be different than shown in FIG. 4.

Figure 5:
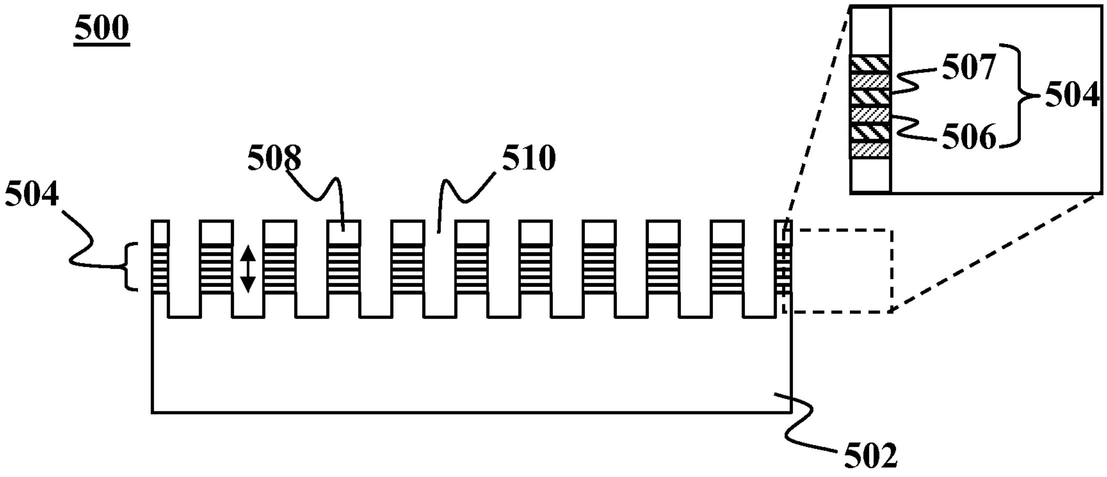
FIG. 5 is a cross-sectional diagram illustrating a calibration standard according to an alternative embodiment of the present invention.

FIG. 5 depicts a standard 500 that is a variation on the standard 400 of FIG. 4. The standard 500 uses a single crystal material of known crystalline orientation, e.g., silicon, as a substrate 502. A vertical calibration feature is defined by a stack 504 of alternating layers of different materials 506, 507. For example, as depicted in the close-up, the stack 504 may include alternating thin layers of polysilicon 506 and silicon oxide 507. A thick layer polysilicon 508, e.g., 0.1 m thick may cover the stack 504. By way of example, the stack may have an overall thickness of about 0.5 μm. The thicknesses of the thin layers 506, 507 within the stack 504 are chosen, so that each layer is thinner than the field of view of a TEM, where the atomic lattice of silicon in the substrate 502 can still be seen. The thickness of each layer 506, 507 can be traceably determined by comparing it to the atomic lattice spacing of silicon in the substrate 502. The standard 500 may include trenches 510 that define a pitch structure as described above with respect to FIG. 4.

Figure 6A:
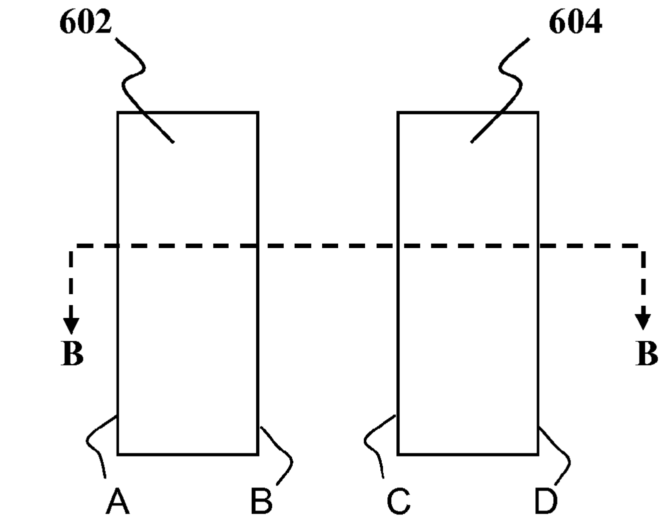
FIG. 6A is a plan view schematic diagram of a sample feature illustrating the difference between pitch and linewidth.
Figure 6B:
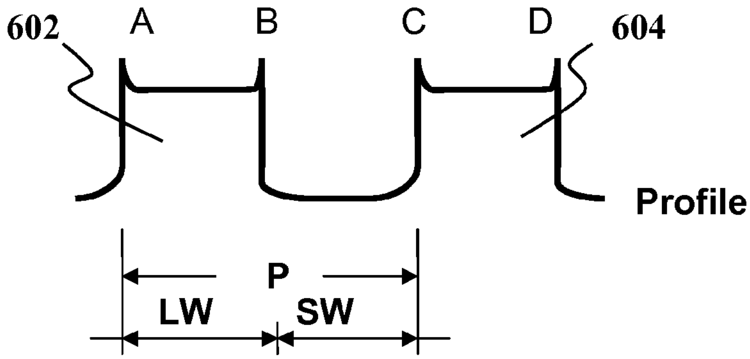
FIG. 6B is a cross-sectional schematic diagram taken along line B-B of FIG. 6A.

The distinction between linewidth and pitch is illustrated with reference to FIG. 6A and FIG. 6B, which depict two adjacent line-like features 602, 604 formed in or on a sample. For the purpose of illustration, the lines may be formed in a plane of the sample, e.g., by etching or deposition or they may be layers of different material exposed by trenching as described herein. The two features 602 and 604 have edges A, B and C, D respectively. A linewidth, LW e.g., of feature 602 is measured between edges A and B. A spacewidth SW between feature 602 and feature 604 is measured between edge B of feature 602 and edge C of feature 604. The pitch P of the features 602, 604 is measured between edge A of feature 602 and edge C of feature 604.

Embodiments of the invention thus utilize a calibration standard having features with traceably measured dimensions to be used for the calibration of dimensions measured by a dual beam tool, e.g., FIB/SEM. The standard includes features built and certified in a direction perpendicular to the plane of the wafer. Embodiments of the present invention allow for calibration of measurements made with dual beam systems in a way that was not previously possible.

Specifically, embodiments of the present invention allow for in-situ calibration in a dual system (e.g., FIB/SEM). By contrast, prior art calibration standards for TEM, such as the MAG*I*CAL® standard, have been built by depositing layers and then sawing a sliver from the sample and mechanically thinning the sliver to a few microns in thickness (in the center only of the piece that has been sawed, with a technique called dimpling). The sliver is then ion milled to about 100 nm in thickness, so that the sample becomes transparent to an electron beam and can be used for TEM. The resulting tiny sliver sawed from the sample is mounted onto a TEM grid and inserted into the TEM to calibrate the TEM, or possibly sold already mounted onto the grid or other suitable substrate. However, such a sample cannot be used to calibrate a dual system FIB/SEM in-situ since the features of the sample are revealed in a vertical plane and the features of the calibration standard are oriented in a horizontal plane. A key feature of embodiments of the present invention is the fact that the calibration sample and the actual sample to be measured are prepared and viewed in a similar way, in the same tool, so that parameters affecting calibration, such as the viewing angle and the cutting angle, can be calibrated out.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A calibration standard, comprising:

a substrate;

a stack of layers of material formed on the substrate, where the stack forms a vertical pitch structure;

a calibrated feature formed in the stack, wherein the calibrated feature includes one or more vertical features, the vertical features being characterized by one or more known dimensions, wherein the calibrated feature is of a type that can be revealed by forming a trench in the calibration standard.

2. The calibration standard of claim 1 wherein the one or more known dimensions are traceably measured dimensions.

3. The calibration standard of claim 1 wherein the one or more known dimensions includes a known thickness of the one or more layers.

4. The calibration standard of claim 1 wherein the two or more layers includes a stack of alternating layers of two or more different materials.

5. The calibration standard of claim 4 wherein the two or more different materials provide contrast when viewed with a scanning electron microscope (SEM).

6. The calibration standard of claim 4 wherein each of the alternating layers in the stack is thinner than a field of view of a transmission electron microscope.

7. The calibration standard of claim 6 wherein the stack of alternating layers is formed on a single crystal substrate, the calibration standard further comprising tracing a thickness of each of the layers of the stack to an atomic spacing of the single crystal substrate.

8. The calibration standard of claim 1 wherein the two or more layers of material includes a layer of a single crystal material having a known crystalline orientation.

9. The calibration standard of claim 8 wherein the layer of single crystal material is silicon having a <110> crystalline orientation.

10. The calibration standard of claim 8 wherein the single crystal layer is disposed between two oxide layers.

11. The calibration standard of claim 8 wherein the calibrated feature includes one or more vertical features formed through the layer of single crystal material.

12. The calibration standard of claim 11 wherein the one or more known dimensions include a sidewall angle of one or more of the vertical features.

13. The calibration standard of claim 11 wherein the one or more vertical features include a plurality of approximately parallel features forming a pitch structure having a known pitch.

14. The calibration standard of claim 1 wherein the stack of layers is made of three layers.

15. The calibration standard of claim 1 wherein the stack of layers is made of more than three layers.

16. The calibration standard of claim 1, further comprising a horizontal pitch etched into the stack.

17. A dual beam metrology/inspection system, comprising:

a stage;

a micromachining tool proximate the stage, the micromachining tool being configured to form a trench in a sample mounted on the stage;

an analytical tool configured to provide images of a portion of a sample mounted to the stage; and a calibration standard mounted to the stage, wherein the standard includes a calibrated vertical feature having one or more known dimensions, wherein the feature is of a type that can be revealed by forming a trench in the calibration standard with the micromachining tool.

18. The system of claim 17 wherein the micromachining tool includes an ion beam source.

19. The system of claim 17 where the micromachining tool is an electron beam tool.

20. The system of claim 17 where the micromachining tool is a laser micromachining tool.

21. The system of claim 17 wherein the analytical tool is a critical-dimension scanning electron microscope (CD-SEM), scatterometer, scanning probe microscope, atomic force microscope, scanning tunneling microscope, lateral force microscope, scanning capacitance microscope, optical microscope, near field optical microscope, patterned wafer inspection system, unpatterned wafer inspection system, reticle inspection system, fly height tester, or disk substrate inspection system.

22. The system of claim 17 wherein the analytical tool is a scanning electron microscope.

* * * * *